US012784372B2

(12) United States Patent
Kips et al.

(10) Patent No.: US 12,784,372 B2
(45) Date of Patent: Nov. 3, 2026

(54) NEURAL RENDERING OF MAKEUP BASED ON IN VITRO COSMETIC ANALYSIS

(71) Applicant: L'Oreal, Paris (FR)

(72) Inventors: Robin Kips, Clichy (FR); Sileye Ba, Clichy (FR)

(73) Assignee: L'Oreal, Paris (FR)

( * ) Notice: Subject to any disclaimer, the term of this patent is extended or adjusted under 35 U.S.C. 154(b) by 176 days.

(21) Appl. No.: 18/702,288

(22) PCT Filed: Oct. 17, 2022

(86) PCT No.: PCT/EP2022/078788
§ 371 (c)(1),
(2) Date: Apr. 17, 2024

(87) PCT Pub. No.: WO2023/066843
PCT Pub. Date: Apr. 27, 2023

(65) Prior Publication Data

US 2024/0412463 A1 Dec. 12, 2024

(30) Foreign Application Priority Data

Oct. 21, 2021 (FR) ........................................ 2111164

(51) Int. Cl.
*G06T 19/00* (2011.01)
*G06F 3/01* (2006.01)
(Continued)

(52) U.S. Cl.
CPC .............. *G06T 19/00* (2013.01); *G06F 3/011* (2013.01); *G06N 3/0475* (2023.01); *G06N 20/00* (2019.01);
(Continued)

(58) Field of Classification Search
CPC ..... G06T 11/001; G06T 19/00; G06T 15/005; G06V 10/82
See application file for complete search history.

(56) References Cited

U.S. PATENT DOCUMENTS

2020/0082595 A1* 3/2020 Okada .................. G06T 15/506
2020/0121567 A1* 4/2020 Gombart .................. A61K 8/29
2020/0160153 A1* 5/2020 Elmoznino ............ G06N 3/094

FOREIGN PATENT DOCUMENTS

JP 2020061023 A * 4/2020
WO 2021/155217 A1 8/2021

OTHER PUBLICATIONS

English translation of JP-2020061023-A, Miyato; Takeru, Apr. 16, 2020 (Year: 2020).*

(Continued)

*Primary Examiner* — Kee M Tung
*Assistant Examiner* — Alicia Ha
(74) *Attorney, Agent, or Firm* — Christensen O'Connor Johnson Kindness PLLC

(57) ABSTRACT

In some embodiments, a computer-implemented method of rendering reference makeup on an input image is provided. A computing system obtains a tensor of neural descriptors that represent attributes of the reference makeup generated by an attribute extractor from a reference image showing the reference makeup. The computing system uses a renderer to generate at least one rendered image based on the input image and the tensor of neural descriptors. The computing system provides the at least one rendered image for display on a display device.

18 Claims, 10 Drawing Sheets

(51) Int. Cl.
*G06N 3/0475* (2023.01)
*G06N 20/00* (2019.01)
*G06T 15/00* (2011.01)
*G06T 19/20* (2011.01)
*G06V 10/82* (2022.01)

(52) U.S. Cl.
CPC ............ *G06T 15/005* (2013.01); *G06T 19/20* (2013.01); *G06V 10/82* (2022.01); *G06T 2219/2012* (2013.01)

(56) References Cited

OTHER PUBLICATIONS

Kips; Robin, "CA-GAN: Weakly Supervised Color Aware GAN for Controllable Makeup Transfer", Aug. 24, 2020, Cham: Springer International Publishing, European conference on computer vision (p. 1, 5, 12) (Year: 2020).*

Stackoverflow, "Do oil pastels work better on paper with more teeth?", archived on Dec. 2, 2019 at https://web.archive.org/web/20191202024848/https://crafts.stackexchange.com/questions/1882/do-oil-pastels-work-better-on-paper-with-more-teeth, accessed on Dec. 4, 2025. (Year: 2019).*

Stackoverflow, "Why should weights of Neural Networks be initialized to random numbers?", archived on Nov. 20, 2018 at https://web.archive.org/web/20181120062220/https://stackoverflow.com/questions/20027598/why-should-weights-of-neural-networks-be-initialized-to-random-numbers, accessed on Dec. 4, 2025. (Year: 2018).*

International Search Report mailed on Jan. 27, 2023, issued in the corresponding International Application No. PCT/EP2022/078788, filed on Oct. 17, 2022; 4 pages.

Written Opinion of the International Searching Authority mailed on Jan. 27, 2023, issued in the corresponding International Application No. PCT/EP2022/078788, filed on Oct. 17, 2022; 12 pages.

Tewari, A. et al., "State of the Art on Neural Rendering," Eurographics 2020 / R. Mantiuk and V. Sundstedt; vol. 39 (2020), No. 2; STAR—State of The Art Report; Apr. 8, 2020; 27 pages.

Kips, R. et al., "Deep Graphics Encoder for Real-Tim Video Makeup Synthesis from Example," arxiv.org, Cornell University Library, May 12, 2021, 5 pages.

Kips, R. et al., "CA-GAN: Weakly Supervised Color Aware GAN for Controllable Makeup Transfer," arxiv.org, Cornell University Library, Aug. 24, 2020, pp. 1-16.

Li, T. et al., "BeautyGAN: Instance-level Facial Makeup Transfer with Deep Generative Adversarial Network," Multimedia, ACM, Oct. 15, 2018, pp. 645-653.

* cited by examiner

NEURAL RENDERING OF MAKEUP BASED ON IN VITRO COSMETIC ANALYSIS

CROSS REFERENCE TO RELATED APPLICATIONS

This application is a National Stage of International Application No. PCT/EP2022/078788, filed Oct. 17, 2022, which claims priority to French Patent Application No. FR2111164, filed on Oct. 21, 2021, the entire contents of which are expressly incorporated by reference herein for all purposes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of rendering reference makeup on an input image is provided. A computing system obtains a tensor of neural descriptors that represent attributes of the reference makeup generated by an attribute extractor from a reference image showing the reference makeup. The computing system uses a renderer to generate at least one rendered image based on the input image and the tensor of neural descriptors. The computing system provides the at least one rendered image for display on a display device.

The renderer may a generative model. The generative model may include at least one of a generative adversarial network (GAN) and a variational autoencoder (VAE). The input image may include depth information, and the renderer may include at least one of a UV mapping component and a three-dimensional modeling component.

Obtaining the tensor of neural descriptors may include retrieving the tensor of neural descriptors from a tensor data store. The computer-implemented method may also include creating, by the computing system, the tensor of neural descriptors that represent attributes of the reference makeup, and storing, by the computing system, the tensor in the tensor data store. Creating the tensor of neural descriptors that represent attributes of the reference makeup may also include using, by the computing system, the attribute extractor to determine the tensor of neural descriptors using at least one in vitro image of the reference makeup. Creating the tensor of neural descriptors that represent attributes of the reference makeup may also include capturing the at least one in vitro image of the reference makeup applied to a sample card having a black portion and a white portion.

The computer-implemented method may also include using the renderer to generate a plurality of rendered images based on a plurality of input images, and providing the at least one rendered image for display on the display device may include providing a video that includes the plurality of rendered images for display on the display device.

In some embodiments, a system for training an attribute extractor and a renderer to render reference makeup on input images is provided. The system includes a computing system including at least one processor and a non-transitory computer-readable medium. The computer-readable medium has computer-executable instructions stored thereon that, in response to execution by the at least one processor, cause the computing system to perform actions including initializing, by the computing system, the attribute extractor and a neural renderer included in the renderer; generating, by the computing system using the attribute extractor, a tensor of neural descriptors that represent attributes of the reference makeup based on a reference image showing the reference makeup; generating, by the computing system using the renderer, a rendered image based on the tensor of neural descriptors and an input image showing a subject without makeup; and updating, by the computing system, at least one of the attribute extractor and the neural renderer based on a comparison between the rendered image and a ground truth image showing the subject with the reference makeup.

Initializing the attribute extractor and the neural renderer may include assigning random weights to the attribute extractor and the neural renderer.

The reference image, the input image, and the ground truth image may form a set of training data. The actions may further comprise repeating the generating and updating actions for a number of iterations, and at least some iterations of the number of iterations use a different set of training data. Updating at least one of the attribute extractor or the neural renderer may include alternating between updating the attribute extractor and updating the neural renderer after one or more iterations. Updating at least one of the attribute extractor or the neural renderer may include independently adjusting a learning rate of the attribute extractor and a learning rate of the neural renderer between iterations.

The system may also include a camera, a sample card configured to accept an application of the reference makeup, and a card support apparatus having a curved stage configured to hold the sample card at a fixed position in relation to the camera. The reference image showing the reference makeup may be captured by the camera and may depict the sample card having the reference makeup applied thereto held by the card support apparatus. The sample card may include a black portion and a white portion, and where the reference makeup may be applied to both the black portion and the white portion. The sample card may include a ribbed texture. The reference makeup may have a pearl finish or a metallic finish.

In some embodiments, a system is provided. The system includes circuitry for obtaining a tensor of neural descriptors that represent attributes of reference makeup generated by an attribute extractor from a reference image showing the reference makeup; circuitry for using a renderer to generate at least one rendered image based on an input image and the tensor of neural descriptors, where the renderer includes a neural renderer; and circuitry for providing the at least one rendered image for display on a display device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Virtual-try-on technologies are now largely spread across online retail platforms and social media. In particular, for makeup, some existing technologies allow consumers to virtually try on cosmetics in augmented reality before purchase. While creating virtual makeup renderings that have an appearance that roughly approximates an appearance of actual makeup can be accomplished, parametrizing a graphical rendering engine for synthesizing realistic images of a given makeup product remains a task that requires expert knowledge in computer graphics. These parameters can take various forms, including but not limited to color values, shine values, texture images, and more complicated functions such as BRDF and SVBRDF. Setting these parameters is a tedious task, and furthermore, some complex appearances (including but not limited to pearl and metallic effects) are difficult to parameterize, measure, or render with accuracy.

To address these technical drawbacks of using purely graphical rendering engines to render makeup images, the present disclosure introduces the incorporation of a neural renderer into a makeup image rendering pipeline. The neural renderer uses a tensor of neural descriptors that are derived by an attribute extractor from in vitro images of reference makeup in order to create rendered images that include the reference makeup.

Using the attribute extractor allows for automatic parameterization of in vitro images, thus eliminating the tedious manual tasks required by graphical rendering engines, and therefore allowing for predictable, reliable extraction of attributes for many different reference makeups. The attribute extractor and neural renderer described herein are also more effective than graphical rendering engines in reproducing makeup with pearl and metallic finishes, thus providing improved performance along with increased efficiency. The use of neural descriptors instead of the complete in vitro reference image provides a more compact representation of the makeup that can easily be embedded in applications where memory usage is critical (e.g., applications that execute on mobile devices or within web browsers). It also allows for comparisons between makeup products within the space of the neural descriptors.

Techniques described herein may be particularly useful for lip makeup (including but not limited to lip primer, lip liner, lip balm, lipstick, lip gloss, lip stain, lip concealer, and combinations thereof) and eye makeup (including but not limited to foundation, eye shadow, eyeliner, and combinations thereof), but these examples should not be seen as limiting. In some embodiments, other types of makeup, including but not limited to mascara; brow makeup; powder, cream, or liquid cheek makeup, or any other type of makeup may be used.

Figure 1:
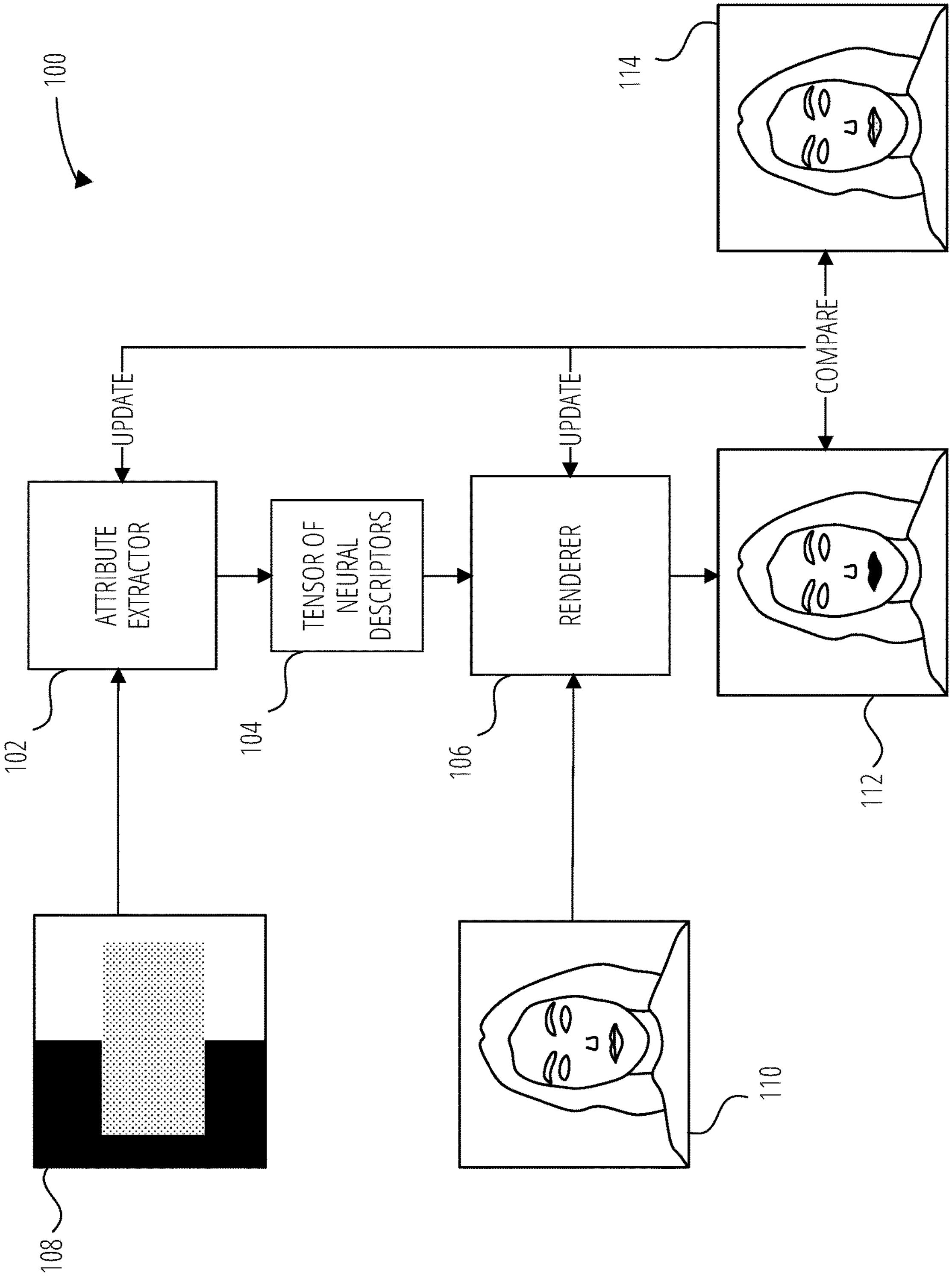
FIG. 1 is a schematic drawing that illustrates a non-limiting example embodiment of training and/or use of an attribute extractor and a renderer to generate rendered images that include makeup according to various aspects of the present disclosure.

FIG. 1 is a schematic drawing that illustrates a non-limiting example embodiment of training and/or use of an attribute extractor and a renderer to generate rendered images that include makeup according to various aspects of the present disclosure.

Figure 2A:
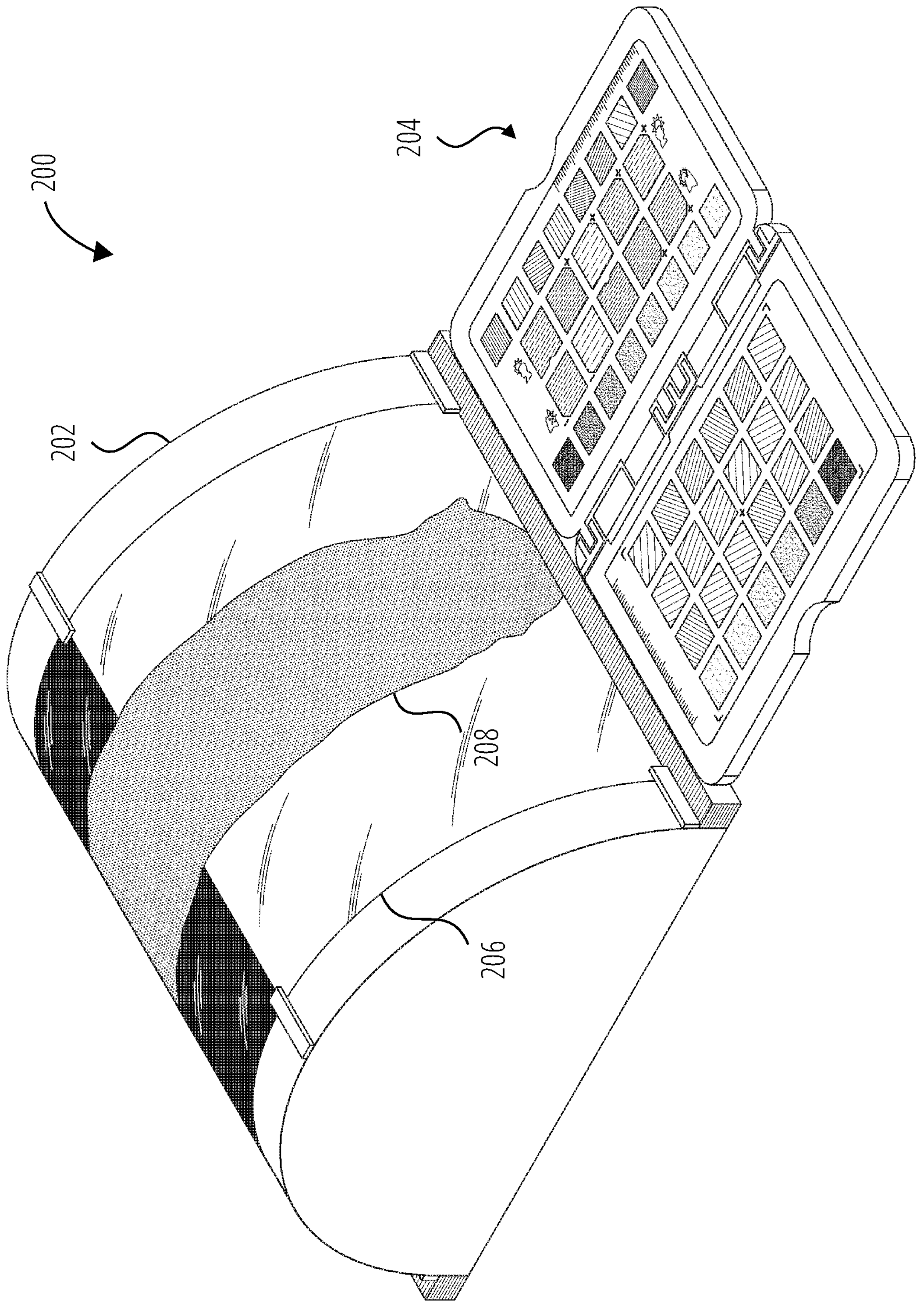
FIG. 2A-FIG. 2C are illustrations of non-limiting example embodiments of a card support apparatus configured to hold sample cards in order to obtain standardized reference images of reference makeup according to various aspects of the present disclosure.
Figure 2B:
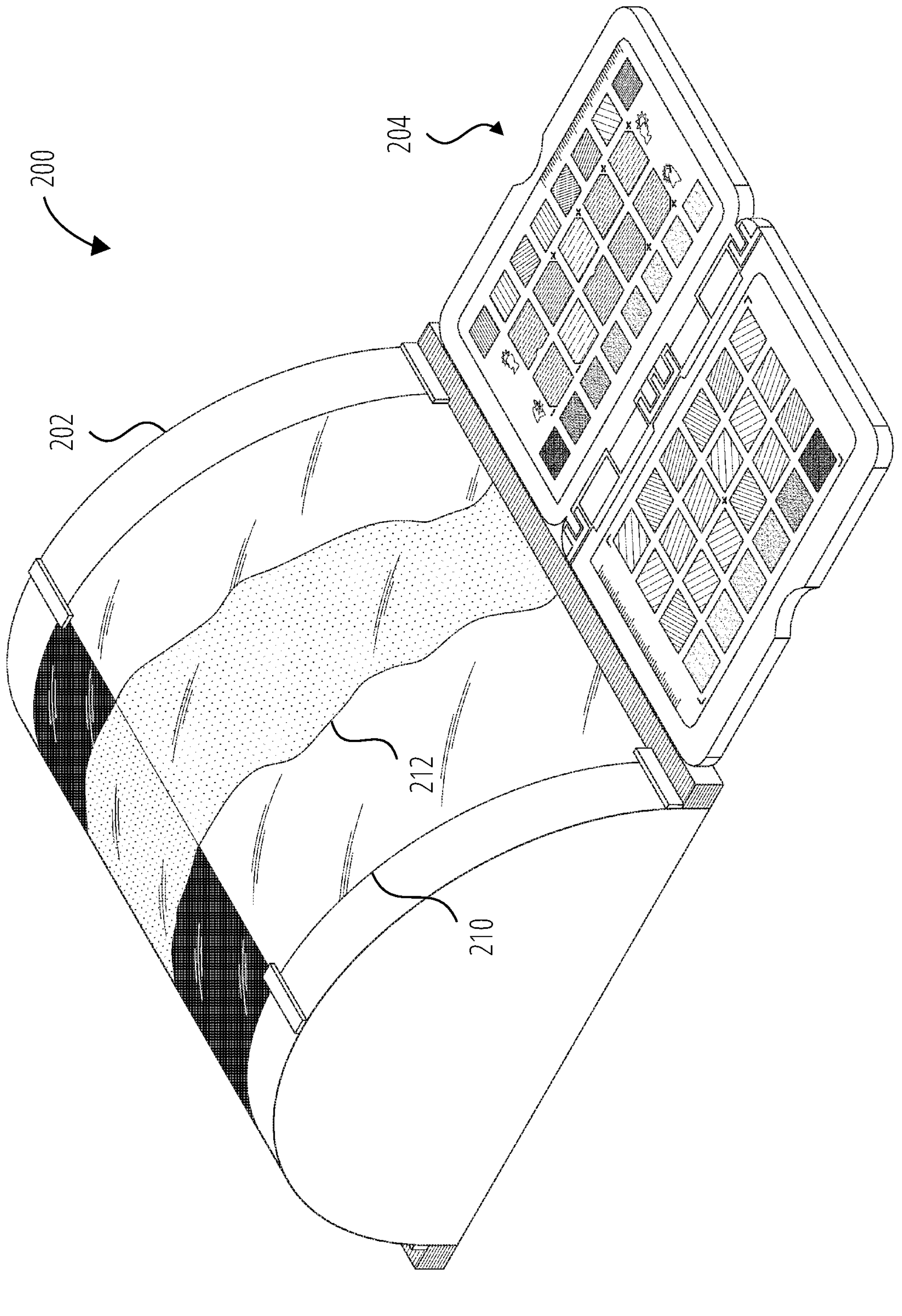
Figure 2C:
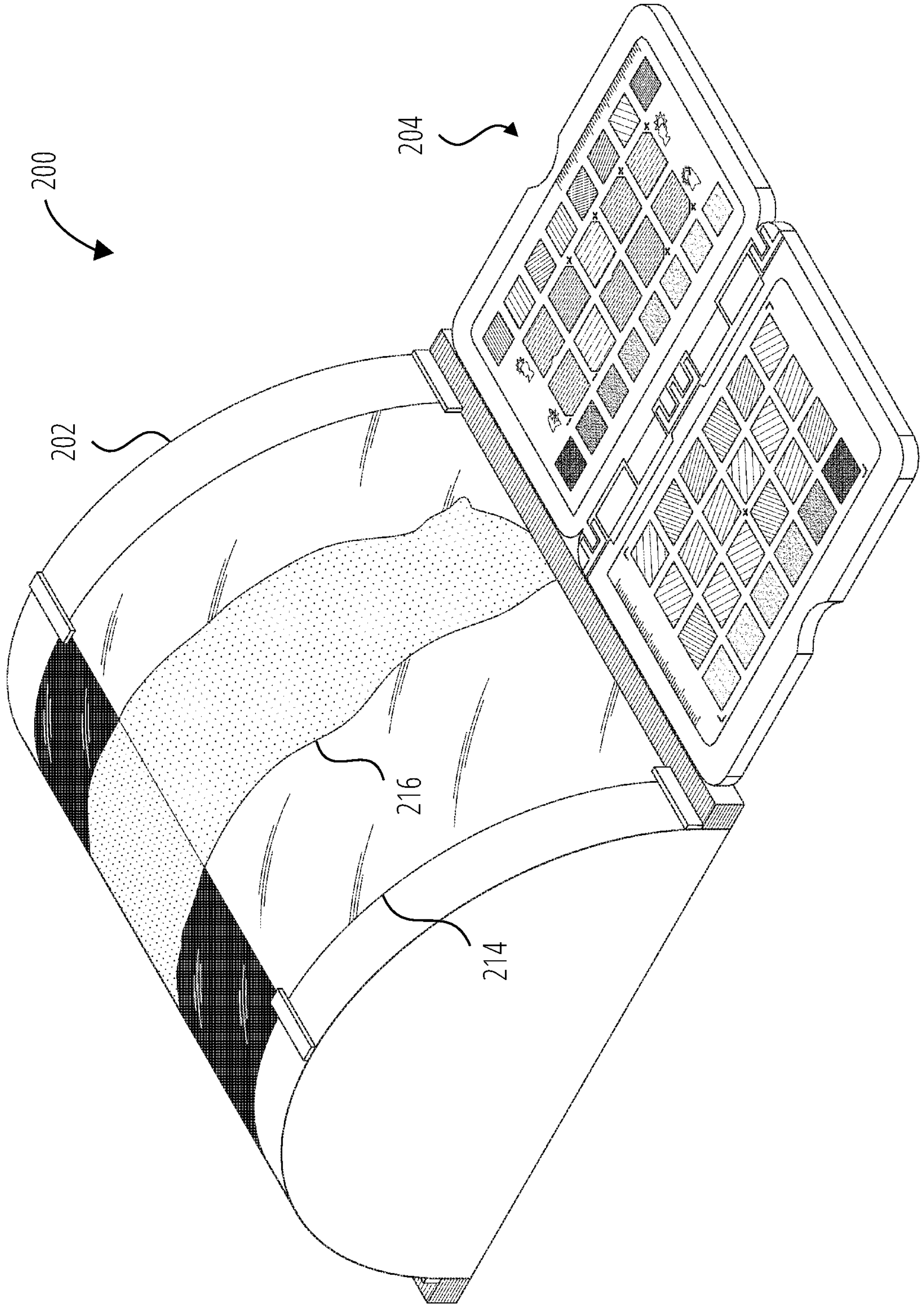

As illustrated, the data flow 100 starts with a reference image 108. The reference image 108 is a standardized in vitro image (e.g., an image collected in a lab or other standardized environment) of reference makeup to be reproduced in rendered images. One non-limiting example of an apparatus for collecting in vitro images is illustrated in FIG. 2A-FIG. 2C and described in further detail below.

The reference image 108 of reference makeup is provided to an attribute extractor 102. In some embodiments, the attribute extractor 102 may include one or more neural networks, including but not limited to a generative model such as a generative adversarial network (GAN), and may be configured to generate a tensor of neural descriptors 104. The tensor of neural descriptors 104 represents the characteristics of the reference makeup in a way that allows them to be reproduced in a rendered image.

A renderer 106 is provided the tensor of neural descriptors 104 and an input image 110 as input. In some embodiments, the input image 110 may be a two-dimensional image of a subject. In some embodiments, the input image 110 may also include depth information.

In some embodiments, the renderer 106 may include a neural renderer that includes a generative model such as a GAN, a variational auto-encoder (VAE), or any other type of neural renderer. In some embodiments, the renderer 106 may include additional components, including but not limited to components for estimating a three-dimensional mesh of a feature in the input image 110, and components for generating a UV map for applying rendered output to the input image 110. In some embodiments, the neural renderer may use the tensor of neural descriptors 104 as an input layer.

Using the input image 110 and the tensor of neural descriptors 104, the renderer 106 then creates a rendered image 112. In a training mode, the rendered image 112 may be compared to a ground truth image 114 that shows the same subject as the input image 110 wearing the reference makeup, and the comparison may be used to update the neural renderer component of the renderer 106 and/or the attribute extractor 102.

Once trained, the attribute extractor 102 and renderer 106 may be used in a rendering mode to create rendered images 112 that accurately reproduce the appearance of the reference makeup. In the rendering mode, the tensor of neural descriptors 104 for given makeup may be created by the attribute extractor 102 and stored for later use. The renderer 106 may then use the stored tensor of neural descriptors 104 and an input image 110 to create a rendered image 112 without performing the comparison or update actions. Though mainly described herein as processing images for the sake of clarity, one of ordinary skill in the art will recognize that such techniques may also be applied to a plurality of images that are frames of an input video, and a plurality of rendered images may be generated to form a rendered video.

For the data flow 100 illustrated in FIG. 1, techniques for collecting standardized reference images of reference makeup are desirable. Any suitable technique for collecting such images may be used. FIG. 2A-FIG. 2C are illustrations of non-limiting example embodiments of a card support apparatus configured to hold sample cards in order to obtain standardized reference images of reference makeup according to various aspects of the present disclosure. Characteristics of reference makeup shown in the standardized reference images (e.g., differences in opacity, color, reflectivity, texture, and/or other characteristics) can be detected by attribute extractors as described herein, and represented by tensors of neural descriptors for use by a renderer to create realistic renderings of the reference makeup.

As illustrated, the card support apparatus 200 includes a curved stage 202. The curved stage 202 includes notches, clips, or other means for affixing a sample card, such as the first sample card 206 illustrated in FIG. 2A, to the curved stage 202 and holding the first sample card 206 in a fixed position. Though not illustrated, the card support apparatus 200 may include a mount to hold a camera in a fixed position in relation to the curved stage 202, and/or one or more mounts for holding one or more illumination devices such as LED lights in a fixed position in relation to the curved stage 202.

As shown, the curved stage 202 is curved along an axis that allows different angles of reflection between the illumination devices and the camera to be captured in a single image. The illustrated curve is an example only and should not be seen as limiting. In other embodiments, other curves may be used. In some embodiments, a flat stage may be provided instead of a curved stage 202.

In some embodiments, the card support apparatus 200 may also include a color reference 204. The color reference 204 may include a variety of blocks of known colors and/or blocks of grayscale that allow for accurate determination of the color of the first reference makeup 208 regardless of an illuminant color or intensity. One example of a suitable color reference 204 is the ColorChecker Color Rendition Chart by X-Rite, Inc., though any other suitable color reference card may be used.

The illustrated first sample card 206 has a glossy surface with a white portion and a black portion. The first reference makeup 208 is applied on the first sample card 206 across both the white portion and the black portion. In some embodiments, the first sample card 206 may also have a texture including but not limited to a ribbed texture.

The characteristics of the first sample card 206, including but not limited to the gloss, the colors, and any textures, allow characteristics of the reference makeup to be derived from the reference image. For example, an opacity of the first reference makeup 208 can be determined based on differences in appearance between the first reference makeup 208 applied to the white portion and the black portion. As another example, reflections of the illumination sources off of the glossy surface of the first sample card 206 can be compared to the reflections of the illumination sources from the first reference makeup 208.

As shown in FIG. 2A, the first reference makeup 208 has a matte finish. As such, reflections are visible on the glossy, exposed portions of the first sample card 206, while no reflections are visible on the first reference makeup 208. Further, the first reference makeup 208 has an opaque finish. As such, there is no visible difference between the portion of the first reference makeup 208 applied to the black portion of the first sample card 206 and the portion of the first reference makeup 208 applied to the white portion of the first sample card 206.

In FIG. 2B, a second sample card 210 with second reference makeup 212 applied thereto is shown mounted to the card support apparatus 200. Compared to the first reference makeup 208 of FIG. 2A, the second reference makeup 212 has a glossier finish. As such, reflections are seen in the second reference makeup 212 as well as the exposed portions of the second sample card 210. Further, the second reference makeup 212 has a more transparent finish than the first reference makeup 208, and so differences can be seen between the portions of the second reference makeup 212 applied to the black portion of the second sample card 210 and the portions of the second reference makeup 212 applied to the white portion of the second sample card 210.

In FIG. 2C, a third sample card 214 with third reference makeup 216 applied thereto is shown mounted to the card support apparatus 200. Compared to the first reference makeup 208 of FIG. 2A, the third reference makeup 216 also has a matte finish and so does not show reflections, but the third reference makeup 216 has a more transparent finish than the first reference makeup 208, and so differences can be seen between the portions of the third reference makeup 216 applied to the black portion of the third sample card 214 and the white portion of the third sample card 214.

While simple lines are used in the figures to denote differences between glossy and matte surfaces under general ambient lighting conditions, in some embodiments, a more structured lighting source may be used in order to gather more detailed reflectivity characteristics of the reference makeup. For example, a lighting source that is a circle or a set of lines may be used, such that the shape of the reflection of the lighting source on the exposed portions of the sample card and the reference makeup may be analyzed.

In the embodiments of the card support apparatus 200 illustrated in FIG. 2A-FIG. 2C, a single reference makeup is shown, but this should not be seen as limiting. In some embodiments, an apparatus may be provided which may allow reference images of multiple reference makeups to be captured at once.

Figure 3:
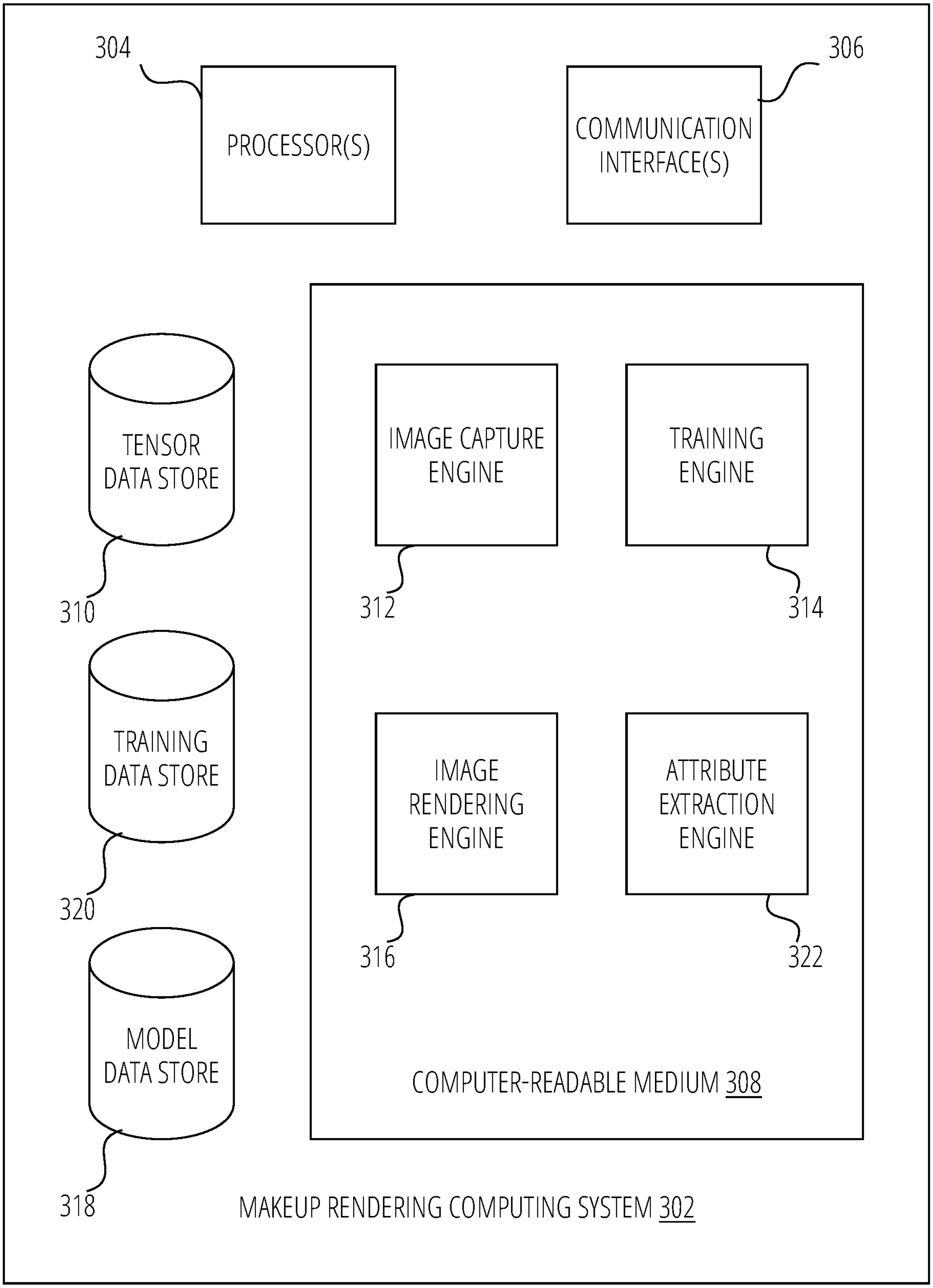
FIG. 3 is a block diagram that illustrates aspects of a non-limiting example embodiment of a makeup rendering computing system according to various aspects of the present disclosure.

FIG. 3 is a block diagram that illustrates aspects of a non-limiting example embodiment of a makeup rendering computing system according to various aspects of the present disclosure. The illustrated makeup rendering computing system 302 may be implemented by any computing device or collection of computing devices, including but not limited to a desktop computing device, a laptop computing device, a mobile computing device, a server computing device, a computing device of a cloud computing system, and/or combinations thereof.

Some embodiments of the makeup rendering computing system 302 are configured, at a high level, to determine neural descriptors that can be used to render makeup based on reference images captured of the makeup in vitro. Some embodiments of the makeup rendering computing system 302 are configured, at a high level, to use neural descriptors and a renderer that includes a neural renderer component to render images of subjects that include renderings of the makeup. Some embodiments of the makeup rendering computing system 302 are configured, at a high level, to train an attribute extractor and/or a neural renderer to accomplish these tasks.

As shown, the makeup rendering computing system 302 includes one or more processors 304, one or more communication interfaces 306, a tensor data store 310, a training data store 320, a model data store 318, and a computer-readable medium 308.

In some embodiments, the processors 304 may include any suitable type of general-purpose computer processor. In some embodiments, the processors 304 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 306 include one or more hardware and or software interfaces suitable for providing communication links between components. The communication interfaces 306 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 308 has stored thereon logic that, in response to execution by the one or more processors 304, cause the makeup rendering computing system 302 to provide an image capture engine 312, a training engine 314, an image rendering engine 316, and an attribute extraction engine 322.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the image capture engine 312 is configured to collect images, including in vitro reference images of reference makeup, ground truth images of subjects wearing the makeup, and input images of subjects to be transformed into rendered images. In some embodiments, the image capture engine 312 is configured to store at least some images as training data sets in the training data store 320. In some embodiments, the training engine 314 is configured to train at least one of an attribute extractor and a neural renderer to be stored in the model data store 318. In some embodiments, the attribute extraction engine 322 is configured to use the attribute extractor to obtain tensors of neural descriptors based on in vitro reference images of makeup, and to store the tensors of neural descriptors in the tensor data store 310. In some embodiments, the image rendering engine 316 is configured to use the neural renderer along with input images and tensors of neural descriptors stored in the tensor data store 310 to create rendered images.

Further description of the configuration of each of these components is provided below.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Though FIG. 3 illustrates the makeup rendering computing system 302 as a single device, this example embodiment should not be seen as limiting. For example, in some embodiments, a computing system used for training an attribute extractor and a neural renderer may include all of the illustrated components, while a computing system used for extracting tensors of neural descriptors from reference images using an already-trained attribute extractor may simply include processors 304, communication interfaces 306, a model data store 318 (to hold the attribute extractor), a tensor data store 310 (to store the extracted tensors of neural descriptors), and a computer-readable medium 308 with an image capture engine 312 and an attribute extraction engine 322. Likewise, a computing system used for rendering images using an already-trained neural renderer and already-extracted tensors of neural descriptors may simply include processors 304, communication interfaces 306, a model data store 318 (to hold the neural renderer), a tensor data store 310 (to store the extracted tensors of neural descriptors), and a computer-readable medium 308 with an image capture engine 312 and an image rendering engine 316.

Figure 4:
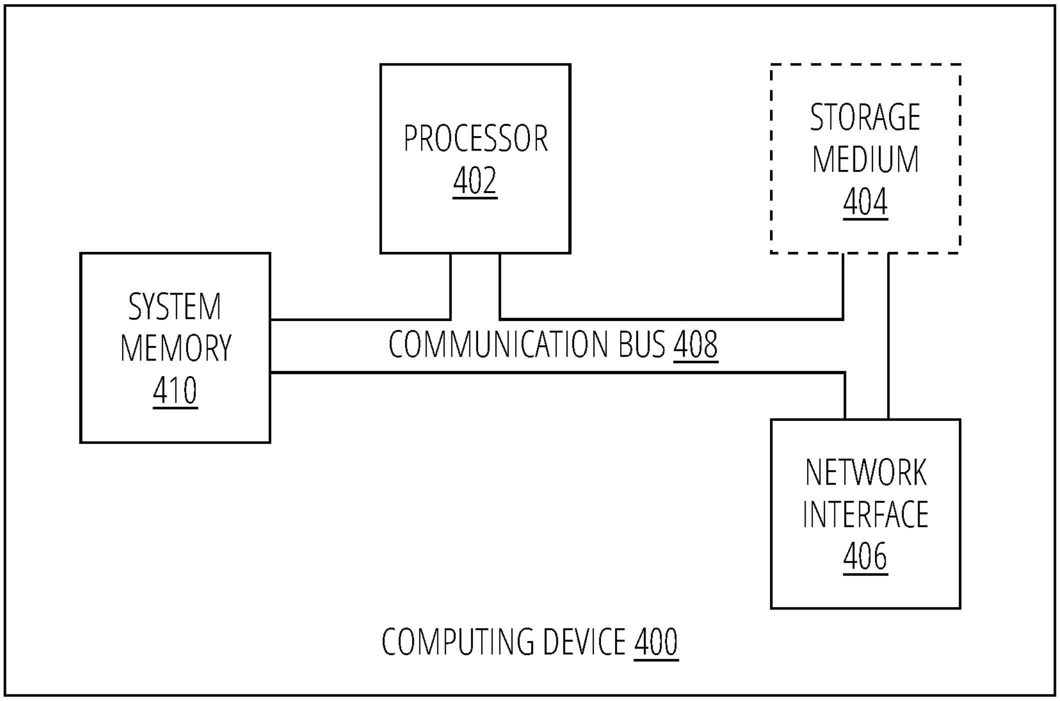
FIG. 4 is a block diagram that illustrates a non-limiting example embodiment of a computing device appropriate for use as a computing device with embodiments of the present disclosure.

FIG. 4 is a block diagram that illustrates aspects of an exemplary computing device 400 appropriate for use as a computing device of the present disclosure. While multiple different types of computing devices were discussed above, the exemplary computing device 400 describes various elements that are common to many different types of computing devices. While FIG. 4 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 400 may be any one of any number of currently available or yet to be developed devices.

In its most basic configuration, the computing device 400 includes at least one processor 402 and a system memory 410 connected by a communication bus 408. Depending on the exact configuration and type of device, the system memory 410 may be volatile or nonvolatile memory, such as read only memory ("ROM"), random access memory ("RAM"), EEPROM, flash memory, or similar memory technology. Those of ordinary skill in the art and others will recognize that system memory 410 typically stores data and/or program modules that are immediately accessible to and/or currently being operated on by the processor 402. In this regard, the processor 402 may serve as a computational center of the computing device 400 by supporting the execution of instructions.

As further illustrated in FIG. 4, the computing device 400 may include a network interface 406 comprising one or more components for communicating with other devices over a network. Embodiments of the present disclosure may access basic services that utilize the network interface 406 to perform communications using common network protocols. The network interface 406 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 406 illustrated in FIG. 4 may represent one or more wireless interfaces or physical communication interfaces described and illustrated above with respect to particular components of the computing device 400.

In the exemplary embodiment depicted in FIG. 4, the computing device 400 also includes a storage medium 404. However, services may be accessed using a computing device that does not include means for persisting data to a local storage medium. Therefore, the storage medium 404 depicted in FIG. 4 is represented with a dashed line to indicate that the storage medium 404 is optional. In any event, the storage medium 404 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 402, system memory 410, communication bus 408, storage medium 404, and network interface 406 are known and commercially available. For ease of illustration and because it is not important for an understanding of the claimed subject matter, FIG. 4 does not show some of the typical components of many computing devices. In this regard, the computing device 400 may include input devices, such as a keyboard, keypad, mouse, microphone, touch input device, touch screen, tablet, and/or the like. Such input devices may be coupled to the computing device 400 by wired or wireless connections including RF, infrared, serial, parallel, Bluetooth, Bluetooth low energy, USB, or other suitable connections protocols using wireless or physical connections. Similarly, the computing device 400 may also include output devices such as a display, speakers, printer, etc. Since these devices are well known in the art, they are not illustrated or described further herein.

Figure 5A:
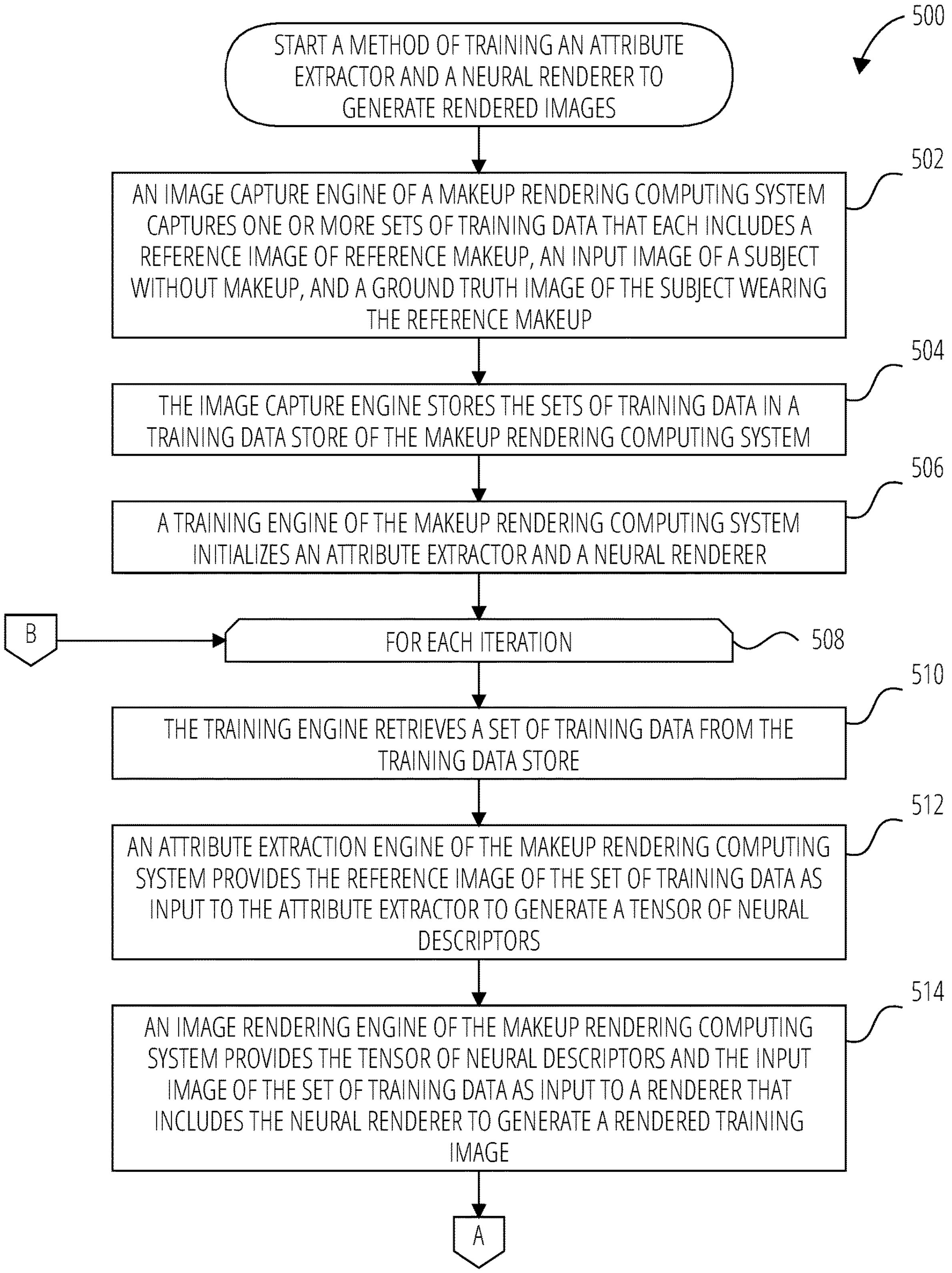
FIG. 5A-FIG. 5B are a flowchart that illustrates a non-limiting example embodiment of a method of training an attribute extractor and a neural renderer to generate rendered images according to various aspects of the present disclosure.
Figure 5B:
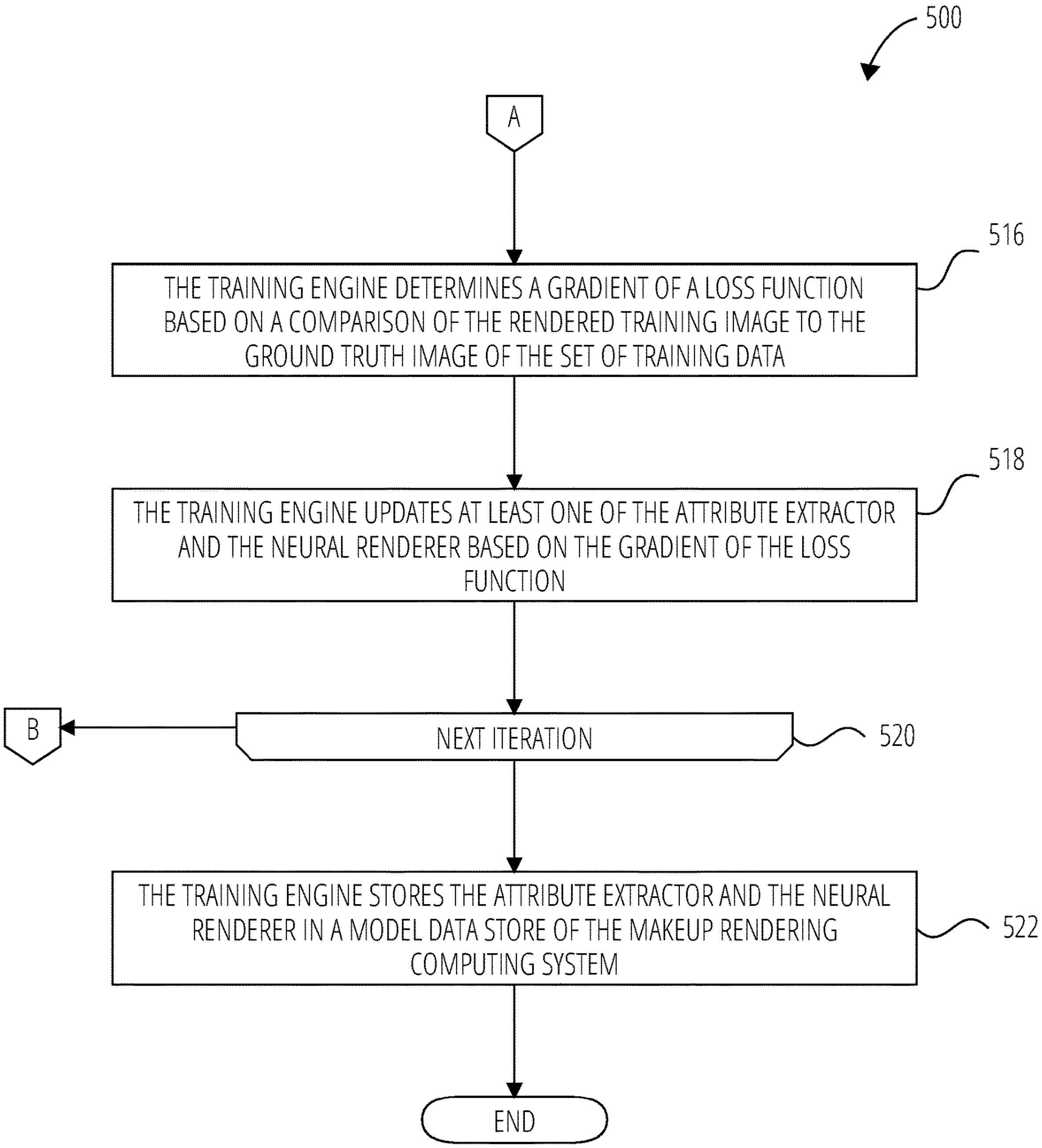

FIG. 5A-FIG. 5B are a flowchart that illustrates a non-limiting example embodiment of a method of training an attribute extractor and a neural renderer to generate rendered images according to various aspects of the present disclosure. In the method 500, an attribute extractor is trained to generate tensors of neural descriptors based on reference images, and the neural renderer is trained to help create rendered images using the tensors of neural descriptors as input.

From a start block, the method 500 proceeds to block 502, where an image capture engine 312 of a makeup rendering computing system 302 captures one or more sets of training data that each includes a reference image of reference makeup, an input image of a subject without makeup, and a ground truth image of the subject wearing the reference makeup. At block 504, the image capture engine 312 stores the sets of training data in a training data store 320 of the makeup rendering computing system 302.

In some embodiments, multiple sets of training data may be captured and stored. For a given set of training data, the reference makeup depicted in the reference image matches the reference makeup worn by the subject in the ground truth image. However, different sets of training data may depict different subjects and/or reference makeup. For example, a first set of training data may depict a first reference makeup and a first subject, and a second set of training data may depict the first reference makeup and a second subject. As another example, a first set of training data may depict a first reference makeup and a first subject, while a second set of training data may depict a second reference makeup and the first subject. As yet another example, the first set of training data and the second training data store may depict both different reference makeups and different subjects. In some embodiments, a set of training data may include a single reference image showing reference makeup and multiple input image/ground truth image pairs, with multiple image pairs for a given subject, images pairs for multiple subjects, or both.

In some embodiments, differences between the input image and the ground truth image may be minimized by using a fixed camera setup to capture both the input image and the ground truth image. In some embodiments, such differences may be minimized by prompting the subject to collect the input image and the ground truth image using an interface that encourages consistent positioning of the face of the subject within the frame of the image. In some embodiments, differences between the input image and the ground truth image may be minimized by performing various normalization image processing tasks, including but not limited to cropping the input image and the ground truth image to the face area or an area depicting a feature of interest, normalizing exposure between the two images, and correcting color differences between the two images.

At block 506, a training engine 314 of the makeup rendering computing system 302 initializes an attribute extractor and a neural renderer. In some embodiments, the attribute extractor may be a suitable type of neural network, including but not limited to a generative model such as a generative adversarial network (GAN) or a variational autoencoder (VAE). Likewise, the neural renderer may also be any suitable type of neural network, including but not limited to a generative model such as a GAN or a VAE. The training engine 314 may use any suitable technique to initialize the attribute extractor and the neural renderer, including but not limited to randomly assigning values to the weights of the neural networks.

The method 500 then proceeds to a for-loop defined between a for-loop start block 508 and a for-loop end block 520, wherein a number of iterations of a generation-comparison-update process are performed. In some embodiments, a predetermined number of iterations are performed, such that the for-loop is executed a predetermined number of times. In some embodiments, iterations of the for-loop may be performed until the attribute extractor and/or the neural renderer converge to an acceptable level of performance.

From the for-loop start block 508, the method 500 proceeds to block 510, where the training engine 314 retrieves a set of training data from the training data store 320. In some embodiments, the training engine 314 may choose a random set of training data from the training data store 320. In some embodiments, the training engine 314 may iterate through the sets of training data stored in the training data store 320 in order to ensure that all of the sets of training data are processed by the method 500.

At block 512, an attribute extraction engine 322 of the makeup rendering computing system 302 provides the reference image of the set of training data as input to the attribute extractor to generate a tensor of neural descriptors. In some embodiments, the tensor of neural descriptors includes values generated by an output layer of a neural network of the attribute extractor. In some embodiments, the tensor of neural descriptors includes weights of a given layer of the neural network of the attribute extractor other than the output layer. In either case, the tensor of neural descriptors represents reproducible aspects of the reference makeup as depicted in the reference image in a format that can be consumed by the neural renderer.

At block 514, an image rendering engine 316 of the makeup rendering computing system 302 provides the tensor of neural descriptors and the input image of the set of training data as input to a renderer that includes the neural renderer to generate a rendered training image. In some embodiments, the neural renderer is an end-to-end neural renderer, such that the input is the input image and the tensor of neural descriptors, and the output is the rendered image. In some embodiments, the renderer includes other components, and the neural renderer performs some (but not all) of the rendering tasks. For example, the renderer may include an image segmentation component that identifies a limited portion of the input image to process, such as a feature of interest for the reference makeup (e.g., lips, eyelids, cheeks, etc.). As another example, the renderer may include a three-dimensional modeling component that estimates a three-dimensional mesh of a feature of interest. As yet another example, the renderer may include a UV mapping component for applying a texture to the three-dimensional mesh.

The method 500 then proceeds to a continuation terminal ("terminal A"). From terminal A (FIG. 5B), the method 500 proceeds to block 516, where the training engine 314 determines a gradient of a loss function based on a comparison of the rendered training image to the ground truth image of the set of training data. The loss function may be any suitable loss function that represents differences between the rendered training image and the ground truth image. In some embodiments, the comparison may be limited to a portion of the ground truth image and the rendered training image, such as a cropped area of a feature of interest. In some embodiments, a single loss function may be used for the comparison. In some embodiments, multiple loss functions may be used, such as a first loss function that represents loss for the attribute extractor and a second loss function that represents loss for the neural renderer.

At block 518, the training engine 314 updates at least one of the attribute extractor and the neural renderer based on the gradient of the loss function. In some embodiments, the training engine 314 updates both the attribute extractor and the neural renderer based on the gradient of the loss function. In some embodiments, the training engine 314 alternates between updating the attribute extractor for one or more iterations and updating the neural renderer for one or more iterations. In some embodiments, the training engine 314 may update the attribute extractor and the neural renderer at the same time, but may independently adjust the learning rate for the updates to the attribute extractor and the learning rate for the updates to the neural renderer such that larger changes are being applied to one than the other.

One will note that although block 518 is illustrated as being within the for-loop between for-loop start block 508 and for-loop end block 520, this example embodiment should not be seen as limiting. In some embodiments, losses may be computed for multiple iterations of the for-loop before performing the updating actions of block 518.

The method 500 then proceeds to the for-loop end block 520. If further iterations of the generation-comparison-update loop are desired, then the method 500 returns to the for-loop start block 508 via a continuation terminal ("terminal B") and performs a subsequent iteration. As discussed above, a number of iterations to be performed may be predetermined, or iterations may be performed until performance of the attribute extractor and the neural renderer converge to acceptable levels.

Otherwise, if no further iterations are desired, then the method 500 proceeds to block 522. At block 522, the training engine 314 stores the attribute extractor and the neural renderer in a model data store 318 of the makeup rendering computing system 302. The method 500 then proceeds to an end block and terminates.

Figure 6A:
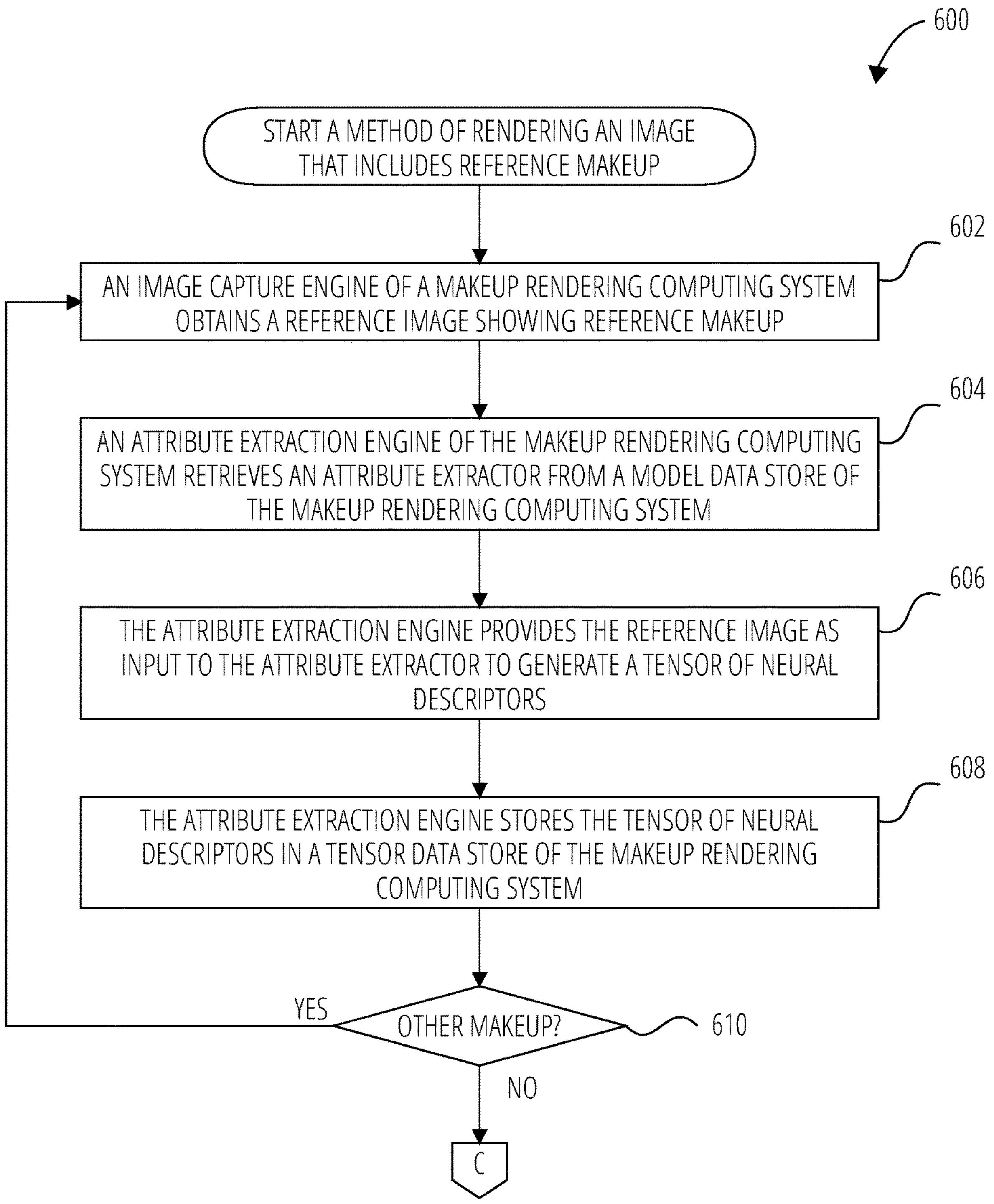
FIG. 6A-FIG. 6B are a flowchart that illustrates a non-limiting example embodiment of a method of rendering an image that includes reference makeup according to various aspects of the present disclosure.
Figure 6B:
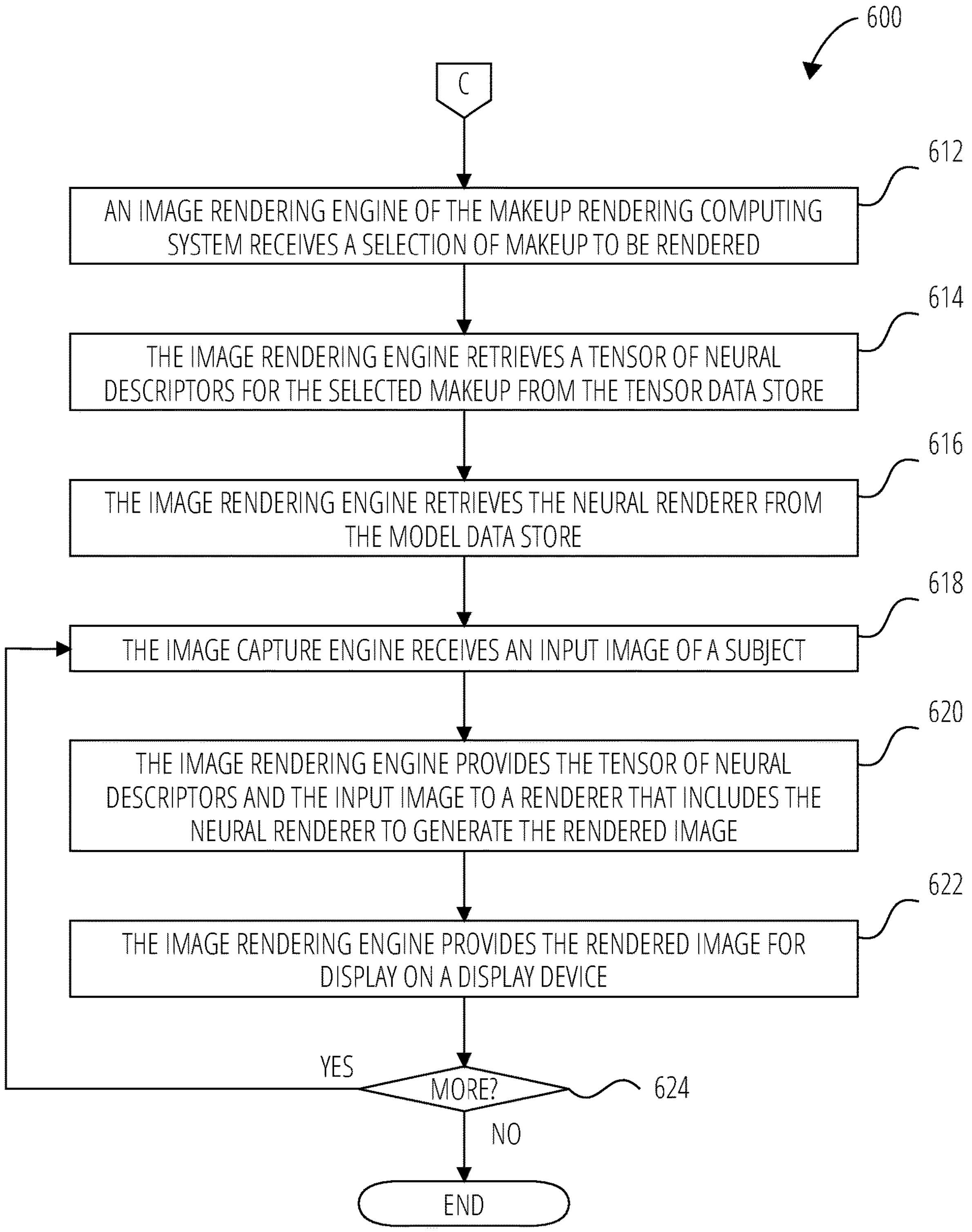

FIG. 6A-FIG. 6B are a flowchart that illustrates a non-limiting example embodiment of a method of rendering an image that includes reference makeup according to various aspects of the present disclosure. In the method 600, the attribute extractor trained by the method 500 is used to generate tensors of neural descriptors for various reference makeup for later use, and the neural renderer trained by the method 500 consumes the generated tensors of neural descriptors to create rendered images.

From a start block, the method 600 proceeds to block 602, where an image capture engine 312 of a makeup rendering computing system 302 obtains a reference image showing reference makeup. In some embodiments, a standardized technique is used to obtain the reference image. For example, the reference makeup may be applied to a first sample card 206, and the first sample card 206 may be mounted in a card support apparatus 200. The reference image may then be captured of the first sample card 206 mounted in the card support apparatus 200 by a camera in a fixed position with respect to the card support apparatus 200, and the camera may transmit the reference image to the image capture engine 312. In some embodiments, the image capture engine 312 may control the camera associated with the card support apparatus 200 to capture the reference image.

At block 604, an attribute extraction engine 322 of the makeup rendering computing system 302 retrieves an attribute extractor from a model data store 318 of the makeup rendering computing system 302. The retrieved attribute extractor is an attribute extractor that was trained using a method such as the method 500 described above. In some embodiments, the attribute extractor may have been trained using the same card support apparatus 200 (or a card support apparatus 200 having matching characteristics such as size, shape, and position with respect to a camera) as the card support apparatus 200 used at block 602 to capture the reference image.

At block 606, the attribute extraction engine 322 provides the reference image as input to the attribute extractor to generate a tensor of neural descriptors, and at block 608, the attribute extraction engine 322 stores the tensor of neural descriptors in a tensor data store 310 of the makeup rendering computing system 302. The stored tensor of neural descriptors includes enough information to let the renderer create rendered images that include the reference makeup, and so, the reference image does not also have to be stored. In some embodiments, the tensor of neural descriptors may also be transmitted to another device, including but not limited to an edge computing device such as a smartphone computing device or tablet computing device, to support creating rendered images that include the reference makeup on such devices. By using the tensor of neural descriptors instead of the entire reference image (and/or the entire attribute extractor), a significant amount of storage space can be saved on the edge computing devices.

Once the tensor of neural descriptors is stored, the method 600 then proceeds to a decision block 610, where a determination is made regarding whether other reference makeup will be processed before continuing. Having been trained using the method 500 described above, the attribute extractor is able to generate tensors of neural descriptors for reference makeup that will be usable to accurately render images including the reference makeup, even if the reference makeup had not been present in the sets of training data. As such, the method 600 may be used to generate tensors of neural descriptors for many different reference makeups, so that the overall system is capable of creating rendered images for a large library of reference makeup. Again, because the tensors of neural descriptors are relatively compact, it is possible to store information for larger libraries of reference makeup in a smaller space than if the original reference images and/or the entire attribute extractor were required.

If it is determined that other reference makeup will be processed, then the result of decision block 610 is YES, and the method 600 returns to block 602 to process the next reference makeup. Otherwise, the result of decision block 610 is NO, and the method 600 advances to a continuation terminal ("terminal C").

From terminal C (FIG. 6B), the method 600 proceeds to block 612, where an image rendering engine 316 of the makeup rendering computing system 302 receives a selection of makeup to be rendered. The selection may be received via a user interface provided by the image rendering engine 316 (or another component of the makeup rendering computing system 302), by receiving a scan of packaging of the makeup, by automatically determining the makeup from a sample image, or via any other technique. In some embodiments, the makeup rendering computing system 302 may only support rendering a single type of makeup, in which case the selection of the makeup to be rendered may not be necessary and the makeup rendering computing system 302 may default to the single type of makeup.

At block 614, the image rendering engine 316 retrieves a tensor of neural descriptors for the selected makeup from the tensor data store 310. The retrieved tensor of neural descriptors would have been created at block 606 and stored in the tensor data store 310 at block 608.

At block 616, the image rendering engine 316 retrieves the neural renderer from the model data store 318. As with the attribute extractor, the neural renderer is a neural renderer that was trained using the method 500 described above.

At block 618, the image capture engine 312 receives an input image of a subject. In some embodiments, the image capture engine 312 may receive the input image from a camera or other device via a communication interface 306. In some embodiments, the image capture engine 312 may control a camera of the makeup rendering computing system 302 to collect the input image.

At block 620, the image rendering engine 316 provides the tensor of neural descriptors and the input image to a renderer that includes the neural renderer to generate the rendered image. In some embodiments, values held in the tensor of neural descriptors are provided as inputs to the neural renderer. In some embodiments, the tensor of neural descriptors itself is provided as an input layer to the neural renderer. In embodiments wherein the neural renderer is an end-to-end renderer, the input image and the tensor of neural descriptors may simply be provided to the neural renderer to generate the rendered image. In embodiments wherein the renderer includes components other than the neural renderer (such as a three-dimensional modeling component and/or a UV mapping component), the input image may be processed by the other components before output of such processing is provided to the neural renderer, and/or the output of the neural renderer may be processed by such components to create the rendered image.

At block 622, the image rendering engine 316 provides the rendered image for display on a display device. In some embodiments, the display device may be a display device of the makeup rendering computing system 302. In some embodiments, the image rendering engine 316 may transmit the rendered image to another device for display. In some embodiments, if multiple input images are being processed, the rendered image may be added to a video to be displayed by the display device.

The method 600 then proceeds to a decision block 624, where a determination is made regarding whether more input images remain to be processed. More input images may remain to be processed if the input images are provided as part of an input video instead of a single image, in which case each frame of the input video may be treated as an input image. If it is determined that more input images remain to be processed, then the result of decision block 624 is YES, and the method 600 returns to block 618 to process the next input image. Otherwise, the result of decision block 624 is NO, and the method 600 proceeds to an end block and terminates.

While illustrative embodiments have been illustrated and described, it will be appreciated that various changes can be made therein without departing from the spirit and scope of the invention.

The invention claimed is:

1. A computer-implemented method of rendering reference makeup on an input image, the method comprising:
- obtaining, by a computing system, a tensor of neural descriptors that represent attributes of the reference makeup generated by an attribute extractor from a reference image showing the reference makeup applied to a sample card having a black portion and a white portion,
  - wherein the reference image shows the sample card being held at a fixed position in relation to a camera on a support having a curved stage,
  - wherein the attribute extractor includes a neural network, and wherein the tensor of neural descriptors includes weights of a given layer of the neural network of the attribute extractor other than an output layer;

using, by the computing system, a renderer to generate at least one rendered image based on the input image and the tensor of neural descriptors; and providing, by the computing system, the at least one rendered image for display on a display device.

2. The computer-implemented method of claim 1, wherein the renderer includes a generative model.

3. The computer-implemented method of claim 2, wherein the generative model includes at least one of a generative adversarial network (GAN) and a variational autoencoder (VAE).

4. The computer-implemented method of claim 2, wherein the input image includes depth information, and wherein the renderer includes at least one of a UV mapping component and a three-dimensional modeling component.

5. The computer-implemented method of claim 1, wherein obtaining the tensor of neural descriptors includes retrieving the tensor of neural descriptors from a tensor data store.

6. The computer-implemented method of claim 5, further comprising:

creating, by the computing system, the tensor of neural descriptors that represent attributes of the reference makeup; and storing, by the computing system, the tensor in the tensor data store.

7. The computer-implemented method of claim 6, wherein creating the tensor of neural descriptors that represent attributes of the reference makeup includes:

using, by the computing system, the attribute extractor to determine the tensor of neural descriptors using at least one in vitro image of the reference makeup.

8. The computer-implemented method of claim 1, wherein using the renderer to generate the at least one rendered image based on the input image and the tensor of neural descriptors includes using the renderer to generate a plurality of rendered images based on a plurality of input images; and wherein providing the at least one rendered image for display on the display device includes providing a video that includes the plurality of rendered images for display on the display device.

9. A system for training an attribute extractor and a renderer to render reference makeup on input images, comprising:

a camera;

a sample card configured to accept an application of the reference makeup;

a card support apparatus having a curved stage configured to hold the sample card at a fixed position in relation to the camera; and a computing system including at least one processor and a non-transitory computer-readable medium having computer-executable instructions stored thereon that, in response to execution by the at least one processor, cause the computing system to perform actions comprising:

initializing, by the computing system, the attribute extractor and a neural renderer included in the renderer;

generating, by the computing system using the attribute extractor, a tensor of neural descriptors that represent attributes of the reference makeup based on a reference image showing the reference makeup;

generating, by the computing system using the renderer, a rendered image based on the tensor of neural descriptors and an input image showing a subject without makeup;

updating, by the computing system, at least one of the attribute extractor or the neural renderer based on a comparison between the rendered image and a ground truth image showing the subject with the reference makeup; and repeating the generating and updating actions for a number of iterations;

wherein updating at least one of the attribute extractor or the neural renderer includes:

alternating between updating the attribute extractor and updating the neural renderer after one or more iterations; or independently adjusting a learning rate of the attribute extractor and a learning rate of the neural renderer between iterations.

10. The system of claim 9, wherein initializing the attribute extractor and the neural renderer includes assigning random weights to the attribute extractor and the neural renderer.

11. The system of claim 9, wherein the reference image, the input image, and the ground truth image form a set of training data; and wherein at least some iterations of the number of iterations use a different set of training data.

12. The system of claim 9, wherein the reference image showing the reference makeup is captured by the camera and depicts the sample card having the reference makeup applied thereto held by the card support apparatus.

13. The system of claim 9, wherein the sample card includes a black portion and a white portion, and wherein the reference makeup is applied to both the black portion and the white portion.

14. The system of claim 9, wherein the sample card includes a ribbed texture.

15. The system of claim 9, wherein the reference makeup has a pearl finish or a metallic finish.

16. A system, comprising:

circuitry for obtaining a tensor of neural descriptors that represent attributes of reference makeup generated by an attribute extractor from a reference image showing the reference makeup, wherein the attribute extractor includes a neural network, and wherein the tensor of neural descriptors includes weights of a given layer of the neural network of the attribute extractor other than an output layer;

circuitry for using a renderer to generate at least one rendered image based on an input image and the tensor of neural descriptors, wherein the renderer includes a neural renderer; and circuitry for providing the at least one rendered image for display on a display device.

17. The system of claim 16, wherein using the renderer to generate the at least one rendered image and the tensor of neural descriptors includes using the renderer to generate a plurality of rendered images based on a plurality of input images; and wherein providing the at least one rendered image for display on the display device includes providing a video that includes the plurality of rendered images for display on the display device.

18. The system of claim 16, wherein the reference image showing the reference makeup shows the reference makeup applied to a sample card being held at a fixed position in relation to a camera on a support having a curved stage, and wherein the sample card has a black portion and a white portion.

* * * * *